United States Patent
Nelson

(10) Patent No.: US 11,036,983 B1
(45) Date of Patent: Jun. 15, 2021

(54) AERIAL IMAGING WIDE AND NARROW STITCHING

(71) Applicant: Sentera, Inc., Minneapolis, MN (US)

(72) Inventor: Ryan Nelson, Minneapolis, MN (US)

(73) Assignee: Sentera, Inc., Minneapolis, MN (US)

( * ) Notice: Subject to any disclaimer, the term of this patent is extended or adjusted under 35 U.S.C. 154(b) by 123 days.

(21) Appl. No.: 16/447,508

(22) Filed: Jun. 20, 2019

(51) Int. Cl.
*G06K 9/00* (2006.01)
*G06T 7/174* (2017.01)
*G06T 7/11* (2017.01)
*B64C 39/02* (2006.01)
*G01C 11/02* (2006.01)

(52) U.S. Cl.
CPC ........ *G06K 9/00657* (2013.01); *B64C 39/024* (2013.01); *G01C 11/02* (2013.01); *G06T 7/11* (2017.01); *G06T 7/174* (2017.01); *B64C 2201/123* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 9,185,290 B1* | 11/2015 | Lapstun | G03B 37/04 |
| 9,664,562 B1* | 5/2017 | Goodnough | G01J 3/0286 |
| 9,945,828 B1* | 4/2018 | Poling | G06T 7/0004 |
| 2009/0268983 A1* | 10/2009 | Stone | H04N 5/2624 |
| | | | 382/284 |
| 2014/0267590 A1* | 9/2014 | McClatchie | G06T 7/70 |
| | | | 348/36 |
| 2016/0150142 A1* | 5/2016 | Lapstun | G03B 15/00 |
| | | | 348/36 |
| 2016/0307447 A1* | 10/2016 | Johnson | B60L 58/12 |

\* cited by examiner

*Primary Examiner* — Hadi Akhavannik
(74) *Attorney, Agent, or Firm* — Hamre, Schumann, Mueller & Larson, P.C.

(57) ABSTRACT

The present subject matter provides a technical solution for various technical problems associated with precision agriculture imagery. A technical solution for stitching together successive passes of captured images may include using multiple image capture devices, where the image capture devices have different fields of view. A first camera may be used to provide a first field of view (FOV), and may be configured to provide a selected ground sample distance (GSD) for precision agriculture imagery analysis. A second camera may be used to provide a wider FOV, and may be used to provide sufficient stitching process overlap between images captured in successive passes.

11 Claims, 4 Drawing Sheets

AERIAL IMAGING WIDE AND NARROW STITCHING

TECHNICAL FIELD

Embodiments described herein generally relate to precision agriculture.

BACKGROUND

In precision agriculture, aerial or satellite imagery may be used to capture an image of an agricultural field. A satellite image may capture an entire field in a single image, however distance between the satellite and the field may provide insufficient image quality for precision agricultural analysis. An aerial vehicle such as an unmanned aerial vehicle (UAV) may provide sufficient image quality for precision agricultural analysis, however it often requires multiple high-resolution images to be captured. However, these multiple high-resolution images need to be combined to form a single field image, and image stitching software may use complex image analysis and comparison algorithms to align the multiple images and generate a high-resolution, stitched output image (e.g., mosaic image) of the agricultural field. What is needed is an improved aerial imagery stitching solution.

DESCRIPTION OF EMBODIMENTS

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1A:
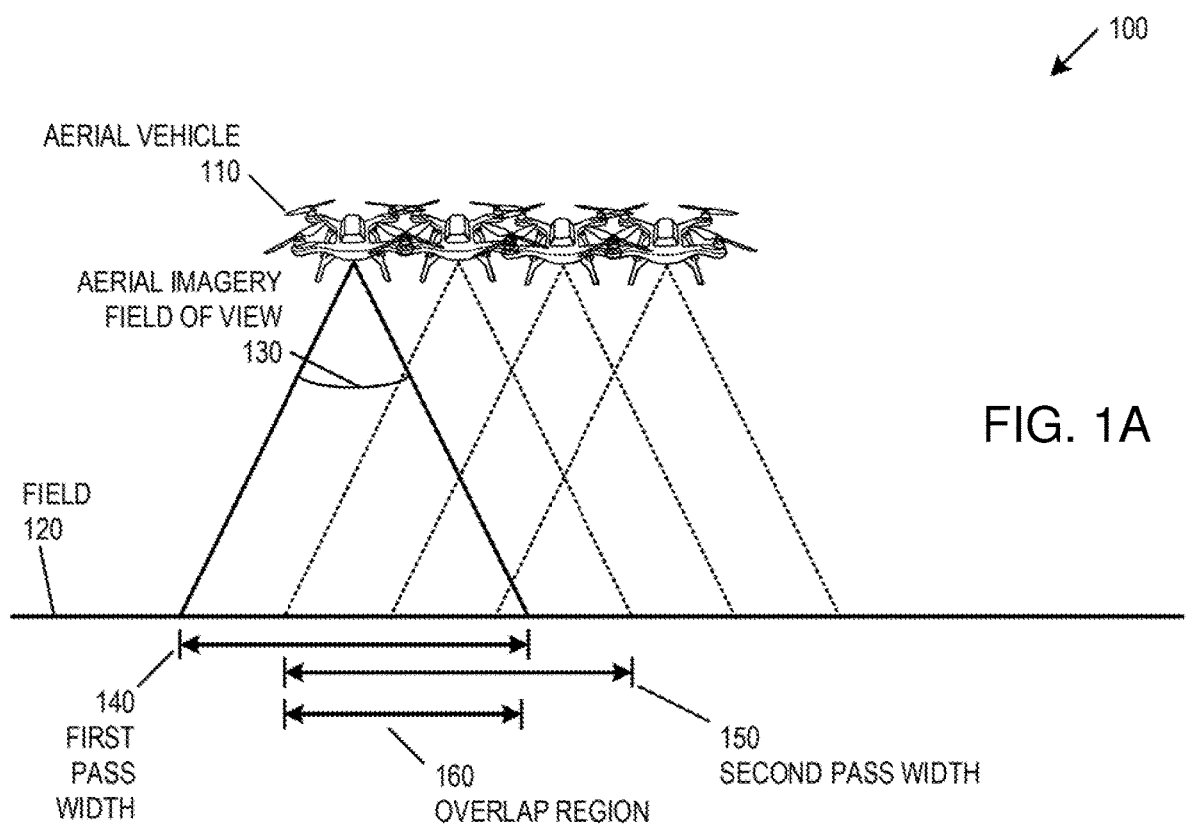
FIGS. 1A-1B are diagrams of a high overlap aerial imagery system, in accordance with at least one embodiment.
Figure 1B:
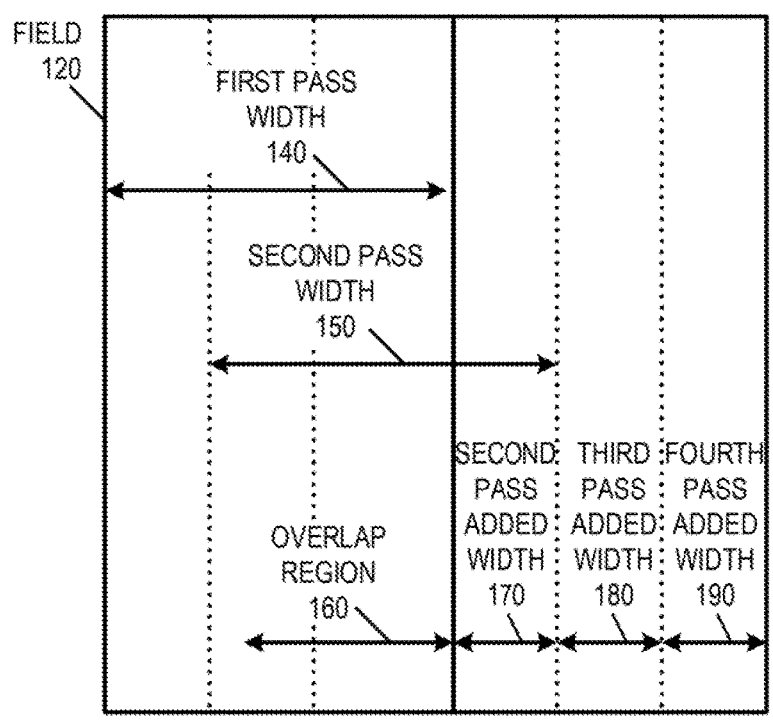

FIGS. 1A-1B are diagrams of a high overlap aerial imagery system 100, in accordance with at least one embodiment. As shown in FIG. 1A, system 100 includes an aerial vehicle 110 to capture a series of images of a field 120. The aerial vehicle 110 flies over the field 120 in successive parallel passes, and uses a downward-facing image capture device (e.g., camera) to capture images, where the images are later stitched together to provide a stitched output image (e.g., mosaic image) of the field 120.

The camera of the aerial vehicle 110 may have an associated aerial imagery field of view (FOV) 130 to provide imagery sufficient for precision agricultural analysis. FIG. 1A shows the horizontal component of the FOV 130, though the aerial imagery FOV 130 includes the full two-dimensional area within each captured image. The precision agricultural analysis may rely on the ability of an image capture device to provide a spatial resolution defined by a ground sample distance (GSD), where the GSD describes the ground distance between two adjacent pixels within the captured image. Each pass of the aerial vehicle 110 may be used to capture a portion of the field 120 with an associated width, such as the first pass width 140 and second pass width 150. In an example, the first pass width 140 is substantially equal to second pass width 150, and this width is based on the GSD, the FOV angle 130, and the spatial resolution of the camera of the aerial vehicle 110. In an example, to collect imagery with a 2 cm GSD using an aerial camera that captures 4,000 pixels in the horizontal direction (e.g., parallel with the first pass width 140), the imaged width of each pass would be approximately 80 meters (e.g., approximately 262 feet).

A technical problem facing precision agriculture imagery is stitching together successive passes of captured images into a stitched output image of the field 120. One technical solution to this technical problem may include capturing successive passes with overlapping regions (e.g., overlap region 160), and matching corresponding features within the overlapping regions. To identify matching corresponding features, the stitching process may need significant overlap between adjacent passes (e.g., sidelap), to identify and match features common among multiple images to determine the relative attitude and position when each image was captured (e.g., image registration). In some examples, the stitching process may need a sidelap of 70%-80% overlap between adjacent passes. To provide the 70%-80% sidelap, successive passes of the aerial vehicle 110 must be close together, which limits how much of the field 120 can be captured within a given amount of time while providing a selected GSD (e.g., a 2 cm GSD).

FIG. 1B shows a top-down view of field 120, first pass width 140, second pass width 150, and overlap region 160. To accommodate a sidelap of 70%-80%, each successive path provides an additional captured width of 20%-30%, such as shown in the second path added width 170, the third path added width 180, and the fourth path added width 190. In the example where each pass provides an imaged width of 80 meters, the first pass width 140 provides a coverage width of up to 80 meters, and each successive pass provides an additional coverage width of 16-24 meters. Similarly, the captured images within each pass are spaced by a selected interval, such as a predefined time interval or predefined aerial vehicle distance interval, which may also use an overlap of 70%-80% for stitching. In some examples, this process results in 70%-80% or more of the captured pixels being used for stitching purposes and not used to create the output stitched image.

Figure 2A:
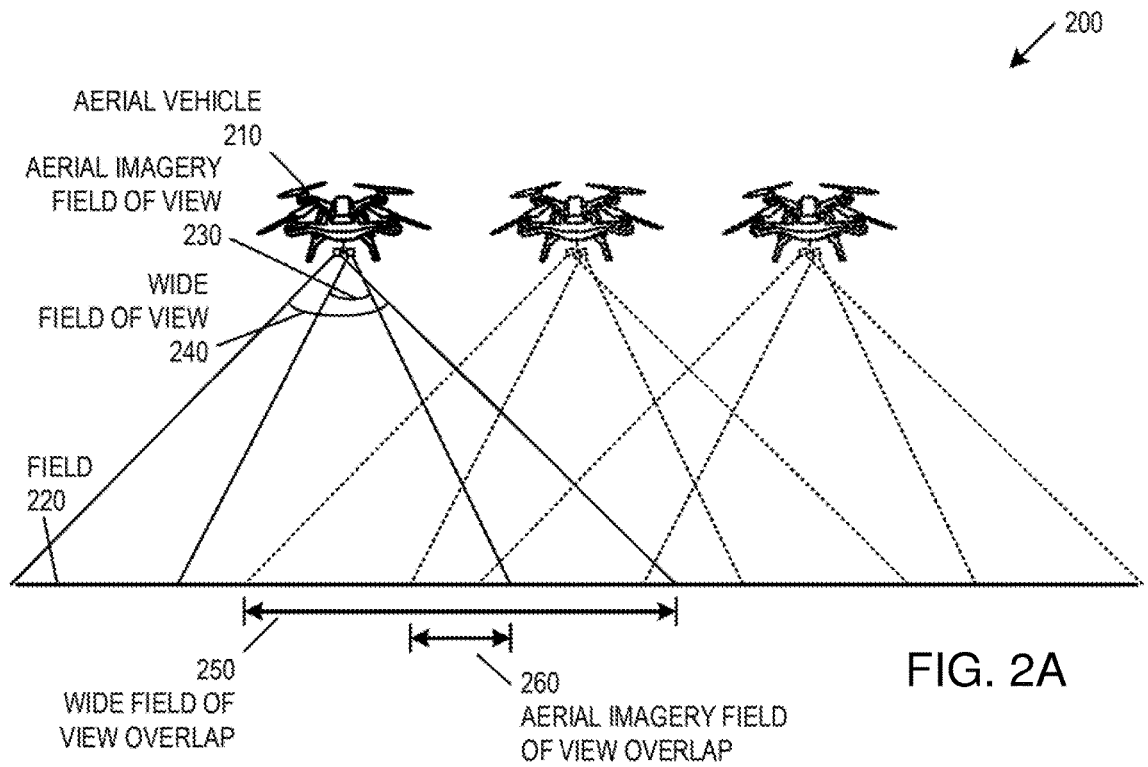
FIGS. 2A-2B are diagrams of a reduced overlap aerial imagery system, in accordance with at least one embodiment.
Figure 2B:
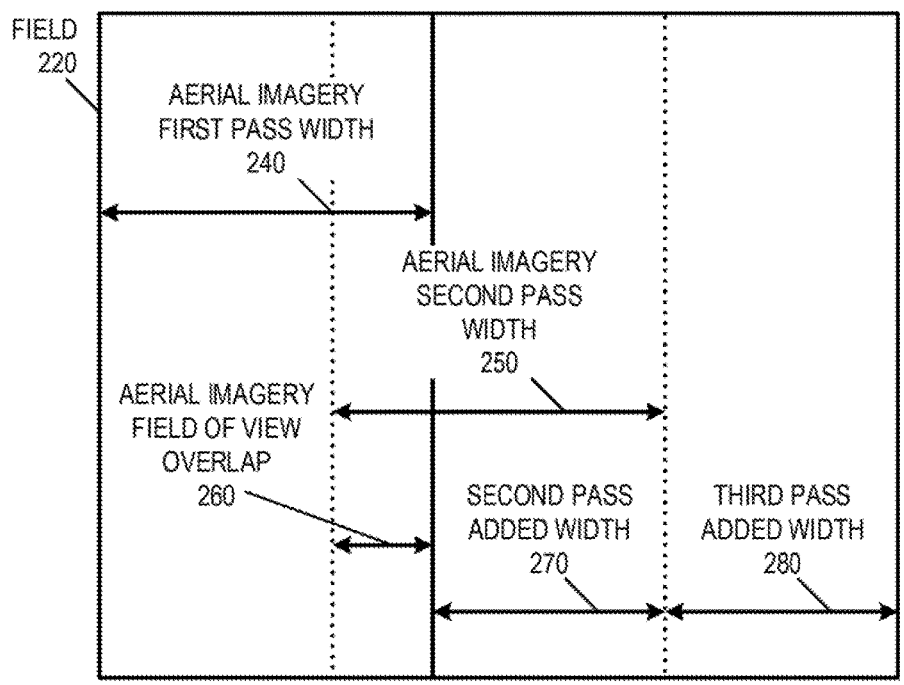

FIGS. 2A-2B are diagrams of a reduced overlap aerial imagery system 200, in accordance with at least one embodiment. As shown in FIG. 2A, system 200 includes an aerial vehicle 210 to capture a series of images of a field 220. Another technical solution for stitching together successive passes of captured images may include using multiple image capture devices, where the image capture devices have different fields of view. For a given image capture device and lens configuration, there is a trade-off between width of FOV and image precision. For example, a single camera may be positioned by an aerial vehicle and focused by a lens to provide the maximum ground area coverage with a selected GSD, and refocusing that camera to a wider FOV may reduce the precision of the output images below the selected GSD.

In an example, a first camera may be used to provide an aerial imagery FOV 230, and may be configured to provide a selected GSD or to conform with other aerial imagery requirement. A second camera may be used to provide a wide FOV 240, and may be used to provide sufficient stitching process overlap between images captured in successive passes, such as the wide FOV overlap 250. The aerial imagery FOV 230 may be referred to as GSD aerial imagery to distinguish it from the wider FOV 240. The aerial imagery FOV 230 provides a GSD coverage consistent with the aerial imagery FOV 130 shown in FIGS. 1A-2B, such as to provide an aerial image with a selected GSD.

The aerial imagery FOV 230 may provide overlap between successive passes, such as the aerial imagery FOV overlap 260. Because the aerial imagery FOV overlap 260 is not needed to perform the image feature identification and matching for the stitching process, the aerial imagery FOV overlap 260 may be reduced to an overlap percentage that is sufficient to provide continuity in adjacent captured images (e.g., no missing portions). The first and second cameras may be arranged adjacent to each other and aligned to point in a common direction, and may be aligned based on an altitude associated with the selected GSD and aerial imagery FOV 230. In another example, a first camera may include an active lens to switch back and forth between the aerial imagery FOV 230 and the wide FOV 240.

FIG. 2B shows a top-down view of field 220, aerial imagery first pass width 230a, aerial imagery second pass width 230b, and aerial imagery FOV overlap 260. By reducing the size of the aerial imagery FOV overlap 260, the second path added width 270 and third path added width 280 provide significantly more coverage per pass than the single FOV solution shown in FIGS. 1A-1B. For example, if the aerial imagery FOV overlap 260 is approximately 20% of the image width, the second path added width 270 and third path added width 280 each use 80% of the pixels captured in each pass, which is significantly more than the 20%-30% of pixels used from each pass in the single FOV solution shown in FIGS. 1A-1B. In the example where each pass provides an imaged width of 80 meters, the first pass width 230a provides a coverage width of up to 80 meters, and each successive pass provides an additional coverage width of 64 meters. In this example, the dual FOV solution described in FIGS. 2A-2B provides 208 meters of horizontal coverage in three passes (e.g., 80+(2×64)=208), whereas the single FOV solution described in FIGS. 1A-1B provides 208 meters of horizontal coverage in nine passes (e.g., 80+(8×16)=208). Similarly, the captured images within each pass are spaced by a selected interval, such as a predefined time interval or predefined aerial vehicle distance interval, which may also use the reduced overlap of 20%. In some examples, this dual FOV solution results in 80% or more of the captured pixels being used to create the output stitched image and not being used only for stitching purposes.

The images captured using the dual FOV configuration may improve the stitching process used to generate the stitched mosaic. The dual FOV provides two types of captured images: GSD aerial images (e.g., higher spatial resolution images providing the desired GSD) and wider FOV images. The GSD aerial images may provide the desired ground distance between two adjacent pixels within the captured image, such as 2 cm between adjacent pixels. The wider FOV images may provide sufficient overlap of adjacent images (e.g., overlap of captured pixels) to enable stitching of the images, such as a 70%-80% overlap of adjacent images.

Various processes may be used to combine these two types of captured images into a stitched mosaic. Example processes may be grouped based on the types of images used in each step. An example one-step user process may include analyzing all image types to generate a stitched mosaic, whereas an example two-step process may include (a) analyzing one image type and (b) applying the analysis to the other image type to generate the stitched mosaic. In the example one-step process, both types of images (e.g., all captured images) may be processed simultaneously by the stitching process and used to generate the stitched mosaic. The stitched mosaic may include only GSD aerial images, or may include both GSD and wider FOV aerial images where the stitching process prioritizes GSD aerial images in creating the stitched mosaic. In this example one-step process, the wider FOV images provide more common features within their 70%-80% overlap, whereas the GSD aerial images provide the desired GSD in the stitched mosaic.

In the example two-step mosaic generation process, the wider FOV images may be analyzed, and the analysis of the wider FOV images may be used to combine the GSD aerial images into the stitched mosaic. In the initial step, the wider FOV images would be used to locate common features to determine the alignment of the wider FOV images relative to each other. In the subsequent step, the determined position and attitude information are applied to the GSD aerial images, which may be modified based on a spatial offset between the two image capture devices. The spatial offset may include differences in distance, position, or pointing angle between the two image capture devices. For example, the two image capture devices may include lenses that are pointed in the same direction (e.g., downward from the aerial vehicle) but separated by a physical distance. Using the aerial vehicle position (e.g., latitude, longitude, altitude), attitude (e.g., image capture lens direction), and image capture offset, the GSD aerial images are combined into a stitched mosaic, and the wider FOV images may be discarded.

By generating the stitched mosaic using only GSD aerial images, the resulting stitched mosaic would provide the desired GSD spatial resolution. By stitching using only the wider FOV images (e.g., excluding the GSD aerial images in the stitching process) and using only the GSD aerial images in the stitched mosaic, this two-step mosaic generation process may significantly reduce the time and computational intensity (e.g., complexity) of the mosaic generation process. However, if the offset of the two image capture devices becomes misaligned, or if there is a delay between the image captures times of the two image capture devices, the stitching process may revert to the more computationally intensive one-step process.

In an alternative embodiment, the two-step mosaic generation process may be modified to use wider FOV images to provide additional, lower spatial resolution coverage in areas of the stitched mosaic not covered by the GSD aerial images. For example, the wider FOV images may be analyzed to determine alignment of the GSD aerial images (e.g., without feature matching analysis of the GSD aerial images) and both types of images may be included in the generated mosaic, where the stitching process prioritizes GSD aerial images in creating the stitched mosaic.

Figure 3:
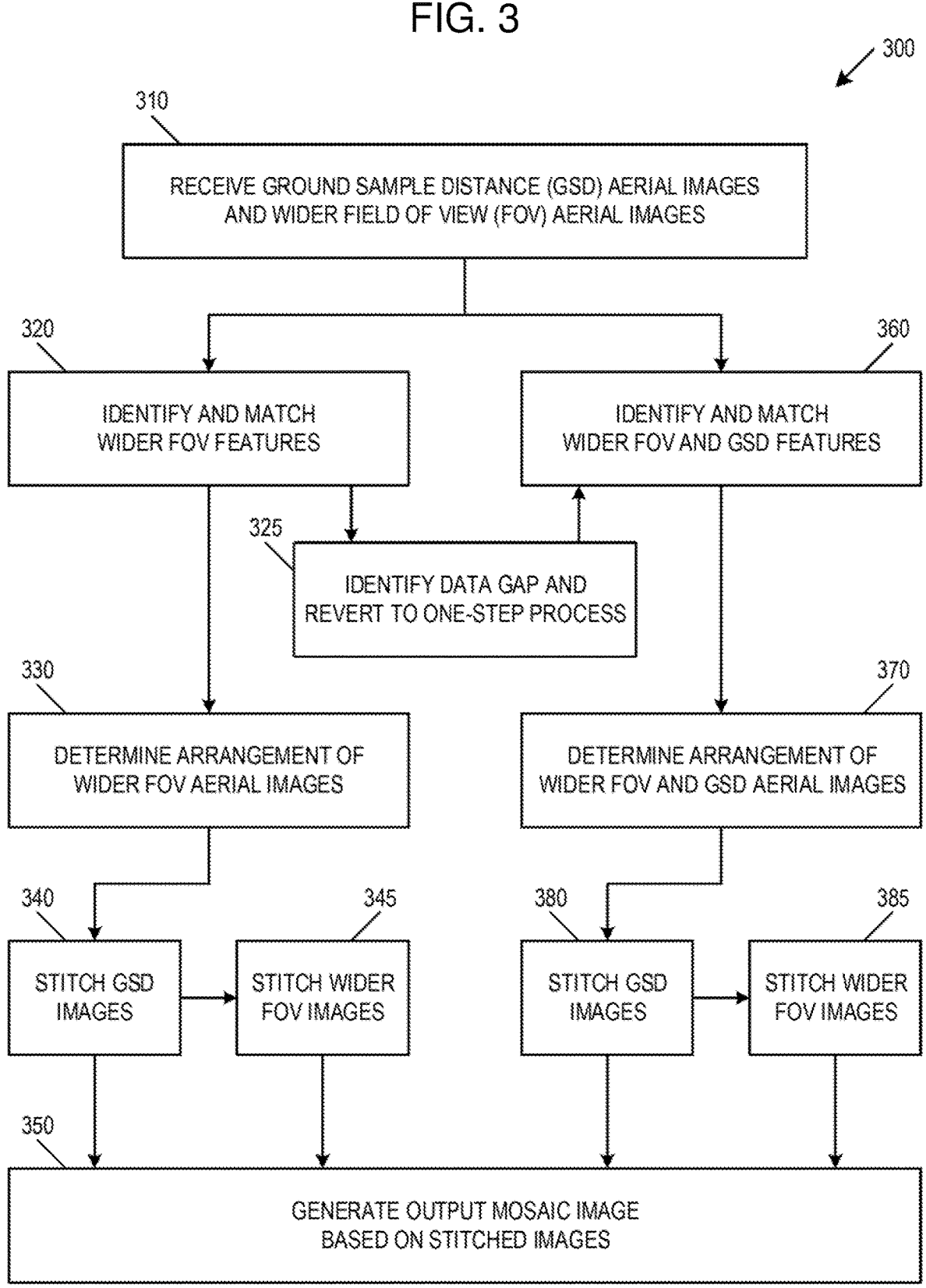
FIG. 3 is an aerial imagery reduced overlap method, according to an example embodiment.

FIG. 3 is an aerial imagery stitching method 300, according to an example embodiment. Method 300 may include receiving 310 a set of GSD aerial images and a set of wider FOV aerial images. The GSD aerial images may be captured to provide a selected GSD spatial resolution, such as a 2 cm GSD. The wider FOV aerial images may be captured to provide a wider FOV than the GSD aerial images, such as to reduce a number of aerial vehicle image capture passes. The images may be received from one or more image capture devices (e.g., cameras).

In an example, the GSD aerial images may have been captured by a first image capture device and the wider FOV aerial images may have been captured by a second image capture device, where the first image capture device is offset from the second image capture device by an image capture device offset. The image capture device offset may be used in subsequent steps to determine an arrangement of the GSD aerial images relative to the wider FOV aerial images. In another example, the GSD aerial images may be captured by a first image capture device using a first FOV lens, and the wider FOV aerial images was captured by the same first image capture device using a wider FOV lens. The lens may include a single active lens that is refocused from a GSD lens to a wider FOV lens, or one GSD lens and a wider FOV lens may be switched as needed to capture GSD images and wider FOV images.

In a synchronous capture example, each image within the GSD aerial images is captured substantially simultaneously with each image within the wider FOV aerial images. This synchronous capture may be used when GSD and wider FOV images are captured using two different image capture devices. In asynchronous capture examples, each image within the GSD aerial images may not be captured substantially simultaneously with each image within the wider FOV aerial images. In the asynchronous capture examples, the images may be captured at regular image capture intervals or at irregular image capture intervals. The irregular image capture intervals may be determined based on various inputs, such as aerial vehicle velocity, a desired GSD or wider FOV ground coverage (e.g., image overlap), or other irregular image capture interval inputs. In an example, the image capture interval may be increased to provide additional imagery within an area, such as in response to a flight perturbation (e.g., aerial vehicle blown off course), to increase image coverage of a complex geographic subsection of a field, or in response to other additional imagery needs.

Method 300 may include identifying and matching 320 a plurality of wider FOV features within the wider FOV aerial images. This may include matching a plurality of identified wider FOV features among two or more of the images within the wider FOV aerial images. Method 300 may include determining 330 an arrangement of the wider FOV aerial images based on the matched plurality of identified wider FOV features. Method 300 may include stitching 340 the GSD aerial images based on the determined arrangement of the wider FOV aerial images. Method 300 may include generating 350 the stitched mosaic image based on the stitched GSD aerial images. This set of method steps is an example of the two-step mosaic generation process described above, in which the analysis of the wider FOV images may be used to combine the GSD aerial images into the stitched mosaic, and the wider FOV images may be discarded.

In another example of the two-step mosaic generation process described above, method 300 includes both stitching 340 the GSD images and stitching 345 the wider FOV images, and generating 350 the stitched mosaic image based on a combination of the stitched GSD and wider FOV aerial images. In this embodiment, the generation 350 of the stitched mosaic image may include prioritizing the GSD aerial images, such as using GSD aerial images whenever possible and using wider FOV images only when a GSD aerial image is not available for a particular area. In all embodiments of the two-step mosaic generation process, the use of only wider FOV images for identification and matching of features 320 may significantly reduce the time and computational intensity of the mosaic generation method 300. While the two-step process may be more computationally efficient, the one-step process may be used to provide corrections or additional coverage. For example, during the process of identifying and matching 320 a plurality of wider FOV features within the wider FOV aerial images, method 300 may identify an aerial image coverage gap and revert 325 to the more computationally intensive one-step process. The aerial image coverage gap may include a gap between adjacent GSD images (e.g., a delay between the image captures times of the two image capture devices), a misalignment of the offset if the two image capture devices become misaligned, or other aerial image coverage gap. The aerial image coverage gap may also include identifying insufficient data within the wider FOV features to perform the stitching process, such as identifying a stitching confidence level below a desired stitching confidence level threshold. Similarly, a user may select the more computationally intensive one-step process to improve a desired stitching confidence level threshold.

In an example of the one-step mosaic generation process described above, both types of images (e.g., all captured images) may be processed simultaneously by the stitching process and used to generate the stitched mosaic. In contrast with the two-step process that may include (a) analyzing one image type and (b) applying the analysis to the other image type based to generate the stitched mosaic, the one-step process may include analyzing all image types to generate a stitched mosaic. In particular, method 300 may include identifying and matching 360 a plurality of wider FOV features and GSD features within both the wider FOV aerial images and the GSD images. Method 300 may include determining 370 an arrangement of the wider FOV aerial images and the GSD aerial images based on the matched plurality of identified wider FOV features and GSD features. Method 300 may include stitching 380 the GSD aerial images based on the determined arrangement of the wider FOV aerial images and generating 350 the stitched mosaic image based on the stitched GSD aerial images. Method 300 may also include stitching 385 the wider FOV images based on the determined arrangement of the GSD aerial images and wider FOV aerial images, and may include generating 350 the stitched mosaic image based on the stitched GSD aerial images and the wider FOV aerial images where the stitching process prioritizes GSD aerial images in creating the stitched mosaic.

Figure 4:
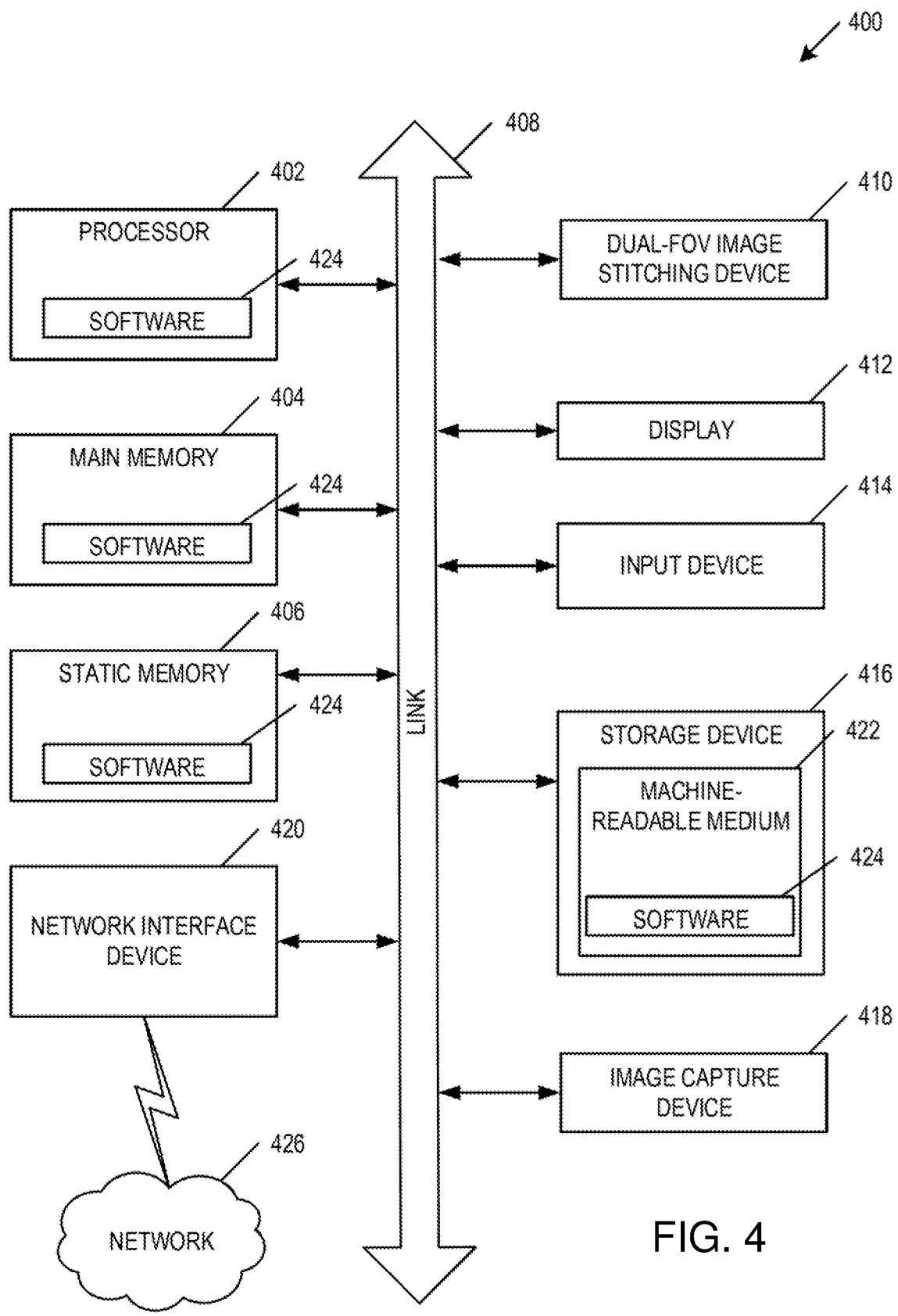
FIG. 4 is a block diagram illustrating an aerial imagery reduced overlap system in an example form of an electronic device, according to an example embodiment.

FIG. 4 is a block diagram illustrating an aerial imagery reduced overlap system in an example form of an electronic device 400, within which a set or sequence of instructions may be executed to cause the machine to perform any one of the methodologies discussed herein, according to an example embodiment. Electronic device 400 may represent an index survey vehicle, or may represent an electronic device on which the index analysis occurs. In alternative embodiments, the electronic device 400 operates as a standalone device or may be connected (e.g., networked) to other machines. In a networked deployment, the electronic device 400 may operate in the capacity of either a server or a client machine in server-client network environments, or it may act as a peer machine in peer-to-peer (or distributed) network environments. The electronic device 400 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 400 capable of executing instructions (sequential or otherwise) that specify actions to be taken by that machine to detect a user input. Further, while only a single electronic device 400 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., processing circuitry, at least one core of a central processing unit, an application-specific instruction circuit, a graphical processing unit, system on a chip (SOC), etc.). The processor-controlled machine (e.g., a computer) may execute instructions, individually or jointly, to perform any one or more of the methodologies discussed herein.

Example electronic device 400 includes at least one processor 402 (e.g., processing circuitry, a central processing unit (CPU), a graphics processing unit (GPU) or both, processor cores, compute nodes, etc.), a main memory 404 and a static memory 406, which communicate with each other via a link 408 (e.g., bus). The main memory 404 or static memory 406 may be used to store navigation data (e.g., predetermined waypoints) or payload data (e.g., stored captured images).

The electronic device 400 may include a dual-FOV image stitching device 410, which may serve as a dedicated device to perform the stitching processes described above. The electronic device 400 may further include a display unit 412, where the display unit 412 may include a single component that provides a user-readable display and a protective layer, or another display type. The electronic device 400 may further include an input device 414, such as a pushbutton, a keyboard, or a user interface (UI) navigation device (e.g., a mouse or touch-sensitive input). The electronic device 400 may additionally include a storage device 416, such as a drive unit. The electronic device 400 may additionally include one or more image capture devices 418 to capture images with different fields of view as described above. The electronic device 400 may additionally include a network interface device 420, and one or more additional sensors (not shown).

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, or within the processor 402 during execution thereof by the electronic device 400. The main memory 404, static memory 406, and the processor 402 may also constitute machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

The aerial vehicle described herein can be a UAV configured as a quad-copter/quad-rotor, other rotorcraft UAVs, a fixed-wing UAV, or other types of UAVs. The UAV can include a first image capture device, such as a first camera, with a first FOV for capturing the GSD aerial images and a second image capture device, such as a second camera, with a second FOV for capturing the wider FOV aerial images. The first and second image capture devices can be spatially offset from one another by a spatial offset distance. Alternatively, the UAV can have a single image capture device, such as a single camera, which has either a single active lens that is refocused from a GSD lens to capture the GSD aerial images and a wider FOV lens to capture the wider FOV aerial images, or the single camera can include a GSD lens and a wider FOV lens which may be switched as needed to capture the GSD aerial images and the wider FOV aerial images. The camera(s) can be located anywhere on the UAV sufficient to allow the camera(s) to capture the GSD aerial images and the wider FOV aerial images.

To better illustrate the method and apparatuses disclosed herein, a non-limiting list of embodiments is provided here.

Example 1 is an aerial imagery stitching system comprising: one or more processors; a storage device comprising instructions, which when executed by the one or more processors, configure the one or more processors to: receive a set of ground sample distance (GSD) aerial images, the GSD aerial images having a selected GSD spatial resolution and having a first field of view (FOV); receive a set of FOV aerial images, the FOV aerial images having a wider FOV than the first FOV of the GSD aerial images; match a plurality of identified FOV features among two or more of the images within the FOV aerial images; determine an arrangement of the FOV aerial images based on the matched plurality of identified FOV features; stitch the GSD aerial images based on the determined arrangement of the FOV aerial images; and generate a stitched mosaic image based on the stitched GSD aerial images.

In Example 2, the subject matter of Example 1 optionally includes the instructions further configuring the one or more processors to: stitch the FOV aerial images and the GSD aerial images together based on the determined arrangement of the FOV aerial images, the stitching including prioritizing the GSD aerial images; and generate the stitched mosaic image further based on the stitched FOV aerial images.

In Example 3, the subject matter of any one or more of Examples 1-2 optionally include the instructions further configuring the one or more processors to: identify a plurality of GSD features within the GSD aerial images; and match a plurality of identified GSD features to the plurality of identified FOV features; determine an arrangement of the GSD aerial images based on the plurality of identified GSD features matched to the plurality of identified FOV features; wherein the stitching of the GSD aerial images is further based on based on the determined arrangement of the GSD aerial images.

In Example 4, the subject matter of Example 3 optionally includes the instructions further configuring the one or more processors to: stitch the FOV aerial images and the GSD aerial images together based on the determined arrangement of the FOV aerial images, the stitching including prioritizing the GSD aerial images; and generate the stitched mosaic image further based on the stitched FOV aerial images.

In Example 5, the subject matter of any one or more of Examples 3-4 optionally include the instructions further configuring the one or more processors to identify an aerial image coverage gap in the matching of the plurality of identified FOV features; wherein the identification of the plurality of GSD features, the matching of the plurality of identified GSD features, and the determination of the arrangement of the GSD aerial images is in response to the identification of the aerial image coverage gap.

In Example 6, the subject matter of any one or more of Examples 1-5 optionally include wherein: the GSD aerial images were captured by a first image capture device; the FOV aerial images were captured by a second image capture device; and the first image capture device is offset from the second image capture device by an image capture device spatial offset.

In Example 7, the subject matter of any one or more of Examples 1-6 optionally include the instructions further configuring the one or more processors to receive an image capture device spatial offset, wherein the arrangement of the GSD aerial images is determined based on applying the image capture device spatial offset to the determined arrangement of the FOV aerial images, the image capture offset identifying a distance between a first image capture device that has captured the GSD aerial images and a second image capture device that has captured the wider FOV aerial images.

In Example 8, the subject matter of any one or more of Examples 1-7 optionally include wherein each image within the GSD aerial images is captured substantially simultaneously with each image within the FOV aerial images.

In Example 9, the subject matter of any one or more of Examples 1-8 optionally include wherein the one or more processors are configured to: receive the GSD aerial images captured from an image capture device with a first FOV lens; and receive the wider FOV aerial images from captured from the image capture device with a second FOV lens, the second FOV lens having a wider FOV than the first FOV lens.

Example 10 is an aerial imagery stitching method comprising: receiving a set of ground sample distance (GSD) aerial images, the GSD aerial images having a selected GSD spatial resolution and having a first field of view (FOV); receiving a set of FOV aerial images, the FOV aerial images having a wider FOV than the first FOV of the GSD aerial images; matching a plurality of identified FOV features among two or more of the images within the FOV aerial images; determining an arrangement of the FOV aerial images based on the matched plurality of identified FOV features; stitching the GSD aerial images based on the determined arrangement of the FOV aerial images; and generating a stitched mosaic image based on the stitched GSD aerial images.

In Example 11, the subject matter of Example 10 optionally includes wherein: the stitching of the GSD aerial images further includes stitching the FOV aerial images and the GSD aerial images together based on the determined arrangement of the FOV aerial images, the stitching including prioritizing the GSD aerial images; and the generation of the stitched mosaic image is further based on the stitched FOV aerial images.

In Example 12, the subject matter of any one or more of Examples 10-11 optionally include identifying a plurality of GSD features within the GSD aerial images; and matching a plurality of identified GSD features to the plurality of identified FOV features; determining an arrangement of the GSD aerial images based on the plurality of identified GSD features matched to the plurality of identified FOV features; wherein the stitching of the GSD aerial images is further based on based on the determined arrangement of the GSD aerial images.

In Example 13, the subject matter of Example 12 optionally includes wherein: the stitching of the GSD aerial images further includes stitching the FOV aerial images and the GSD aerial images together based on the determined arrangement of the FOV aerial images, the stitching including prioritizing the GSD aerial images; and the generation of the stitched mosaic image is further based on the stitched FOV aerial images.

In Example 14, the subject matter of any one or more of Examples 12-13 optionally include identifying an aerial image coverage gap in the matching of the plurality of identified FOV features; wherein the identification of the plurality of GSD features, the matching of the plurality of identified GSD features, and the determination of the arrangement of the GSD aerial images is in response to the identification of the aerial image coverage gap.

In Example 15, the subject matter of any one or more of Examples 10-14 optionally include wherein: the GSD aerial images were captured by a first image capture device; the FOV aerial images were captured by a second image capture device; and the first image capture device is offset from the second image capture device by an image capture device spatial offset.

In Example 16, the subject matter of any one or more of Examples 10-15 optionally include receiving an image capture device spatial offset, wherein the arrangement of the GSD aerial images is determined based on applying the image capture device spatial offset to the determined arrangement of the FOV aerial images, the image capture offset identifying a distance between a first image capture device that has captured the GSD aerial images and a second image capture device that has captured the wider FOV aerial images.

In Example 17, the subject matter of any one or more of Examples 10-16 optionally include wherein each image within the GSD aerial images is captured substantially simultaneously with each image within the FOV aerial images.

In Example 18, the subject matter of any one or more of Examples 10-17 optionally include wherein: the GSD aerial images were captured by a first image capture device with a first FOV lens; and the FOV aerial images were captured by the first image capture device with a FOV lens, the second FOV lens having a wider FOV than the first FOV lens.

Example 19 is one or more machine-readable medium including instructions, which when executed by a computing system, cause the computing system to perform any of the methods of Examples 10-18.

Example 20 is an apparatus comprising means for performing any of the methods of Examples 10-18.

Example 21 is a machine-readable storage medium comprising a plurality of instructions that, when executed with a processor of a device, cause the device to: receive a set of ground sample distance (GSD) aerial images, the GSD aerial images having a selected GSD spatial resolution and having a first field of view (FOV); receive a set of FOV aerial images, the FOV aerial images having a wider FOV than the first FOV of the GSD aerial images; match a plurality of identified FOV features among two or more of the images within the FOV aerial images; determine an arrangement of the FOV aerial images based on the matched plurality of identified FOV features; stitch the GSD aerial images based on the determined arrangement of the FOV aerial images; and generate a stitched mosaic image based on the stitched GSD aerial images.

In Example 22, the subject matter of Example 21 optionally includes wherein: the stitching of the GSD aerial images further includes stitching the FOV aerial images and the GSD aerial images together based on the determined arrangement of the FOV aerial images, the stitching including prioritizing the GSD aerial images; and the generation of the stitched mosaic image is further based on the stitched FOV aerial images.

In Example 23, the subject matter of any one or more of Examples 21-22 optionally include the instructions further causing the device to: identify a plurality of GSD features within the GSD aerial images; and match a plurality of identified GSD features to the plurality of identified FOV features; determine an arrangement of the GSD aerial images based on the plurality of identified GSD features matched to the plurality of identified FOV features; wherein the stitching of the GSD aerial images is further based on based on the determined arrangement of the GSD aerial images.

In Example 24, the subject matter of Example 23 optionally includes wherein: the stitching of the GSD aerial images further includes stitching the FOV aerial images and the GSD aerial images together based on the determined arrangement of the FOV aerial images, the stitching including prioritizing the GSD aerial images; and the generation of the stitched mosaic image is further based on the stitched FOV aerial images.

In Example 25, the subject matter of any one or more of Examples 23-24 optionally include the instructions further causing the device to identify an aerial image coverage gap in the matching of the plurality of identified FOV features; wherein the identification of the plurality of GSD features, the matching of the plurality of identified GSD features, and the determination of the arrangement of the GSD aerial images is in response to the identification of the aerial image coverage gap.

In Example 26, the subject matter of any one or more of Examples 21-25 optionally include wherein: the GSD aerial images were captured by a first image capture device; the FOV aerial images were captured by a second image capture device; and the first image capture device is offset from the second image capture device by an image capture device spatial offset.

In Example 27, the subject matter of any one or more of Examples 21-26 optionally include the instructions further causing the device to receive an image capture device spatial offset, wherein the arrangement of the GSD aerial images is determined based on applying the image capture device spatial offset to the determined arrangement of the FOV aerial images, the image capture offset identifying a distance between a first image capture device that has captured the GSD aerial images and a second image capture device that has captured the wider FOV aerial images.

In Example 28, the subject matter of any one or more of Examples 21-27 optionally include wherein each image within the GSD aerial images is captured substantially simultaneously with each image within the FOV aerial images.

In Example 29, the subject matter of any one or more of Examples 21-28 optionally include wherein: the GSD aerial images were captured by a first image capture device with a first FOV lens; and the FOV aerial images were captured by the first image capture device with a FOV lens, the second FOV lens having a wider FOV than the first FOV lens.

Example 30 is an aerial imagery stitching apparatus comprising: means for receiving a set of ground sample distance (GSD) aerial images, the GSD aerial images having a selected GSD spatial resolution and having a first field of view (FOV); means for receiving a set of FOV aerial images, the FOV aerial images having a wider FOV than the first FOV of the GSD aerial images; means for matching a plurality of identified FOV features among two or more of the images within the FOV aerial images; means for determining an arrangement of the FOV aerial images based on the matched plurality of identified FOV features; means for stitching the GSD aerial images based on the determined arrangement of the FOV aerial images; and means for generating a stitched mosaic image based on the stitched GSD aerial images.

Example 31 is one or more machine-readable medium including instructions, which when executed by a machine, cause the machine to perform operations of any of the operations of Examples 1-30.

Example 32 is a system to perform the operations of any of the Examples 1-30.

Example 33 is a method to perform the operations of any of the Examples 1-30.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An aerial imagery stitching system comprising:
   one or more processors;
   a storage device comprising instructions, which when executed by the one or more processors, configure the one or more processors to:
      receive a set of ground sample distance (GSD) aerial images, the GSD aerial images having a selected GSD spatial resolution and having a first field of view (FOV);
      receive a set of FOV aerial images, the FOV aerial images having a wider FOV than the first FOV of the GSD aerial images;
      match a plurality of identified FOV features among two or more of the images within the FOV aerial images without matching GSD features among the GSD aerial images and the FOV aerial images;
      determine an arrangement of the FOV aerial images based on the matched plurality of identified FOV features;
      determine an arrangement of the GSD aerial images based on the determined arrangement of the FOV aerial images;
      generate a stitched mosaic image using the GSD aerial images based on the determined arrangement of the GSD aerial images.

2. The system of claim 1, the instructions further configuring the one or more processors to:
   generate the stitched mosaic image further using the FOV aerial images including prioritizing the GSD aerial images.

3. The system of claim 1, the instructions further configuring the one or more processors to receive an image capture device spatial offset, wherein the arrangement of the GSD aerial images is determined based on applying the image capture device spatial offset to the determined arrangement of the FOV aerial images, the image capture device spatial offset identifying a distance between a first image capture device that has captured the GSD aerial images and a second image capture device that has captured the wider FOV aerial images.

4. The system of claim 1, wherein the one or more processors are configured to:
   receive the GSD aerial images captured from an image capture device with a first FOV lens; and
   receive the wider FOV aerial images captured from the image capture device with a second FOV lens, the second FOV lens having a wider FOV than the first FOV lens.

5. An aerial imagery stitching method comprising:
   receiving a set of ground sample distance (GSD) aerial images, the GSD aerial images having a selected GSD spatial resolution and having a first field of view (FOV);
   receiving a set of FOV aerial images, the FOV aerial images having a wider FOV than the first FOV of the GSD aerial images;
   matching a plurality of identified FOV features among two or more of the images within the FOV aerial images without matching GSD features among the GSD aerial images and the FOV aerial images;
   determining an arrangement of the FOV aerial images based on the matched plurality of identified FOV features;
   determine an arrangement of the GSD aerial images based on the determined arrangement of the FOV aerial images; and
   generating a stitched mosaic image using the GSD images based on the determined arrangement of the GSD aerial images.

6. The method of claim 5, further comprising:
   generating the stitched mosaic image using the FOV aerial images and prioritizing the GSD aerial images.

7. The method of claim 5, further including receiving an image capture device spatial offset, wherein the arrangement of the GSD aerial images is determined based on applying the image capture device spatial offset to the determined arrangement of the FOV aerial images, the image capture device spatial offset identifying a distance between a first image capture device that has captured the GSD aerial images and a second image capture device that has captured the wider FOV aerial images.

8. The method of claim 5, wherein:
   the GSD aerial images are captured by a first image capture device with a first FOV lens; and
   the FOV aerial images are captured by the first image capture device with a FOV lens, the second FOV lens having a wider FOV than the first FOV lens.

9. A non-transitory machine-readable storage medium comprising a plurality of instructions that, when executed with a processor of a device, cause the device to:
   receive a set of ground sample distance (GSD) aerial images, the GSD aerial images having a selected GSD spatial resolution and having a first field of view (FOV);
   receive a set of FOV aerial images, the FOV aerial images having a wider FOV than the first FOV of the GSD aerial images;
   match a plurality of identified FOV features among two or more of the images within the FOV aerial images without matching GSD features among the GSD aerial images and the FOV aerial images;

determine an arrangement of the FOV aerial images based on the matched plurality of identified FOV features;

determine an arrangement of the GSD aerial images based on the determined arrangement of the FOV aerial images; and generate a stitched mosaic image using the GSD images based on the determined arrangement of the GSD aerial images.

10. The non-transitory machine-readable storage medium of claim 9, wherein:

the generation of the stitched mosaic image further includes using the FOV aerial images and prioritizing the GSD aerial images.

11. The non-transitory machine-readable storage medium of claim 9, the instructions further causing the device to receive an image capture device spatial offset, wherein the arrangement of the GSD aerial images is determined based on applying the image capture device spatial offset to the determined arrangement of the FOV aerial images, the image capture device spatial offset identifying a distance between a first image capture device that has captured the GSD aerial images and a second image capture device that has captured the wider FOV aerial images.

* * * * *